(12) United States Patent
Song

(10) Patent No.: US 8,666,455 B2
(45) Date of Patent: Mar. 4, 2014

(54) APPARATUS HAVING A FLEXIBLE DISPLAY AND METHOD OF CONTROLLING THE SAME

(75) Inventor: Hochan Song, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/523,467

(22) Filed: Jun. 14, 2012

(65) Prior Publication Data

US 2012/0329528 A1     Dec. 27, 2012

(30) Foreign Application Priority Data

Jun. 23, 2011 (KR) .................. 10-2011-0060977

(51) Int. Cl.
*H04M 1/00* (2006.01)

(52) U.S. Cl.
USPC ........................................ 455/566

(58) Field of Classification Search
USPC .......... 455/566, 556.1, 73, 557, 414.2, 414.1, 455/567; 345/173, 211, 647, 157, 501, 619, 345/174, 207
See application file for complete search history.

(56) References Cited

U.S. PATENT DOCUMENTS

| | | | |
|---|---|---|---|
| 2008/0125181 A1* | 5/2008 | Yoon ............................. | 455/566 |
| 2009/0231358 A1* | 9/2009 | Ellwood, Jr. .................. | 345/619 |
| 2010/0056223 A1* | 3/2010 | Choi et al. .................... | 455/566 |
| 2010/0079356 A1* | 4/2010 | Hoellwarth ...................... | 345/8 |
| 2010/0141605 A1* | 6/2010 | Kang et al. .................... | 345/174 |
| 2011/0227855 A1* | 9/2011 | Kim et al. ..................... | 345/173 |

* cited by examiner

*Primary Examiner* — Kiet Doan
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a flexible display; at least one sensor arranged in a prescribed form on the flexible display and configured to convert a flex state of the flexible display into an electric signal; and a controller configured to determine the flex state of the flexible display using the electric signal input from the at least one sensor, and control a visual effect corresponding to the determined flex state and output the visual effect on the flexible display.

17 Claims, 10 Drawing Sheets

FIG. 4
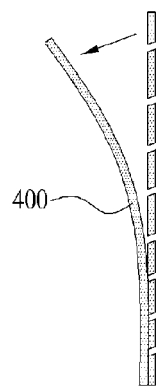
(a)
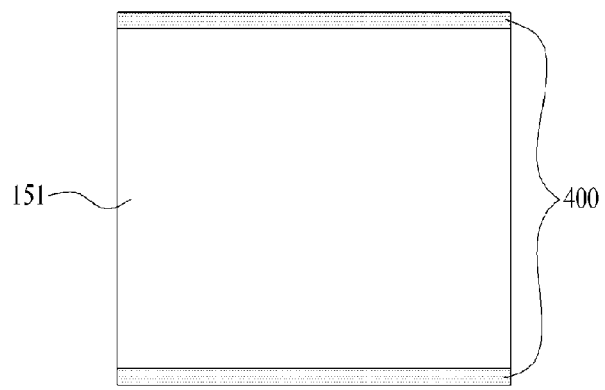
(b)
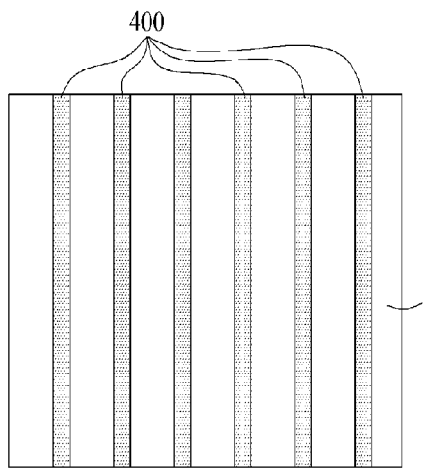
(c)
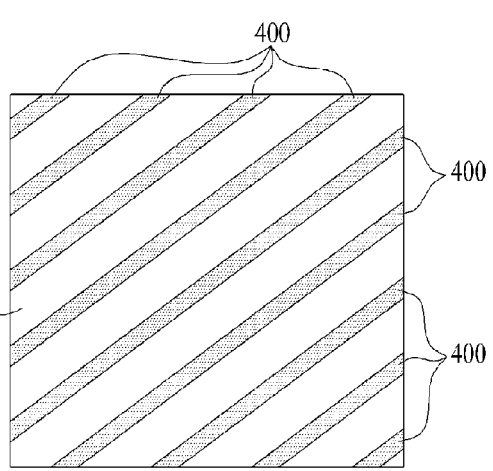
(d)

FIG. 6
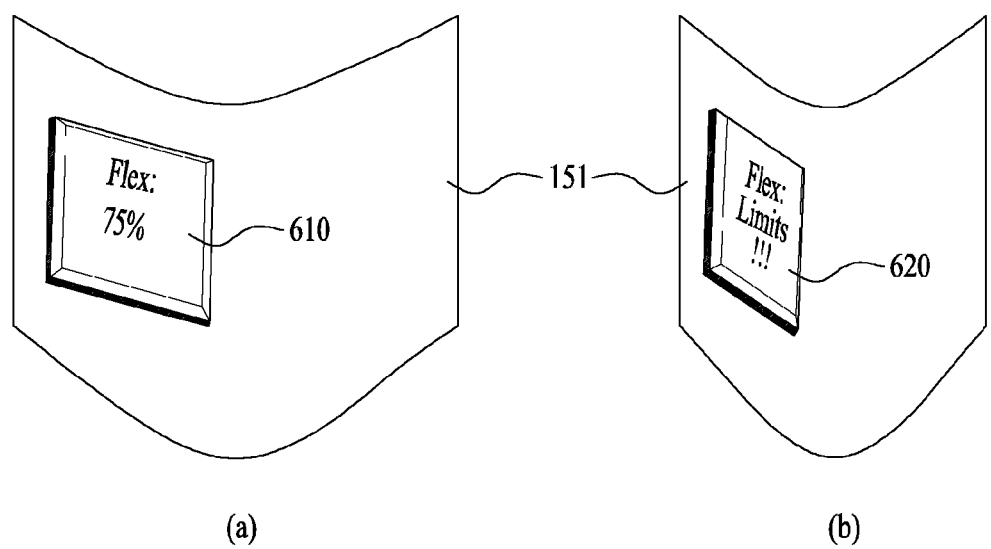
(a)  (b)
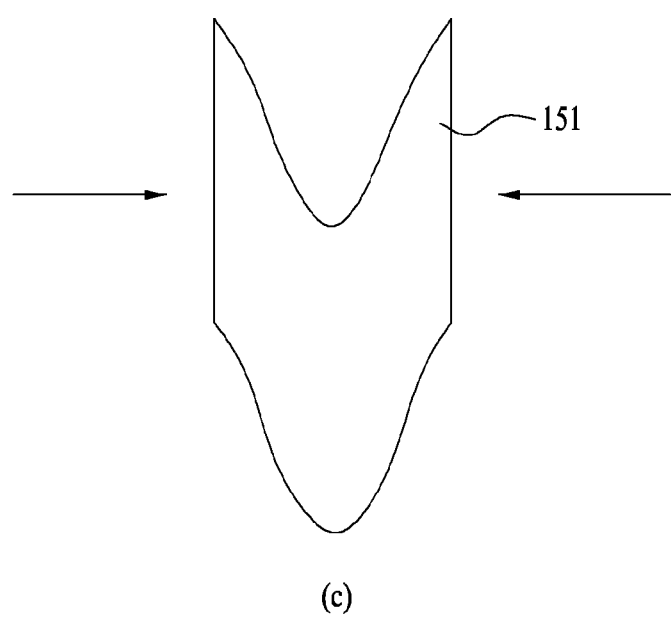
(c)

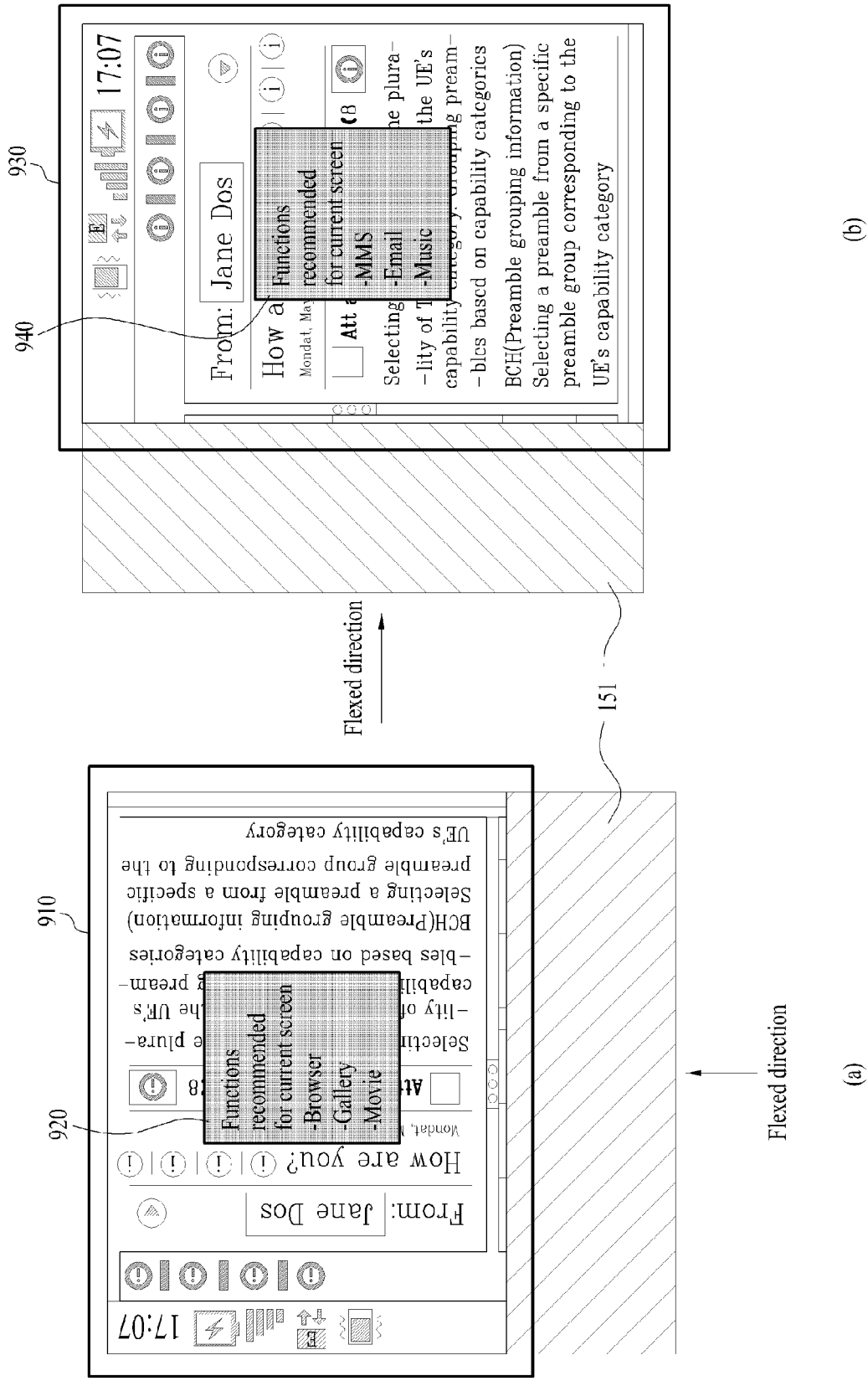

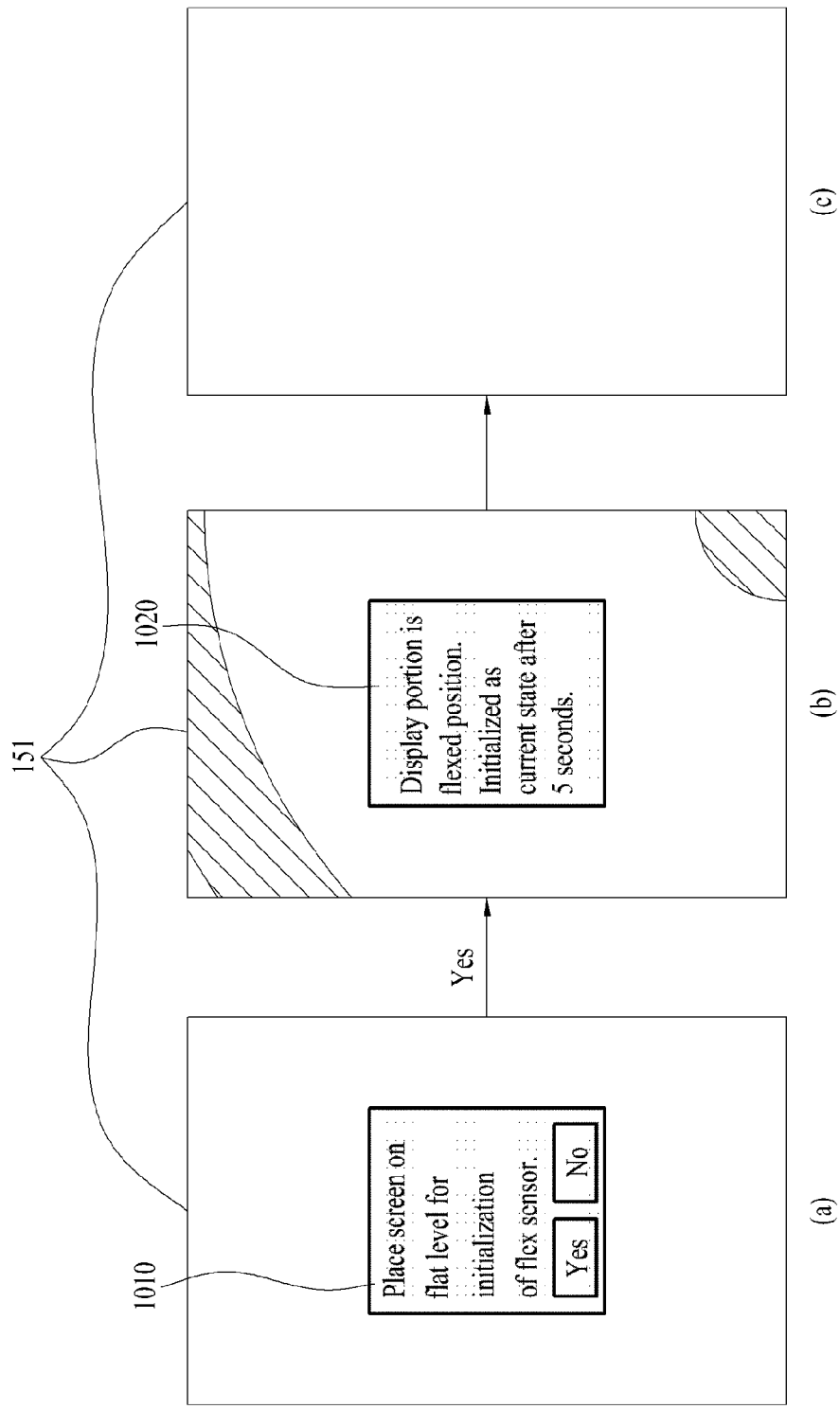

APPARATUS HAVING A FLEXIBLE DISPLAY AND METHOD OF CONTROLLING THE SAME

Pursuant to 35 U.S.C. §119(a), this application claims the benefit of earlier filing date and right of priority to Korean Patent Application No. 10-2011-0060977, filed on Jun. 23, 2011, the contents of which are hereby incorporated by reference herein in their entirety.

BACKGROUND OF THE INVENTION

1. Field of the Invention

The present invention relates to a display apparatus, and more particularly, to a display apparatus having a flexible display and method of controlling the same.

2. Discussion of the Related Art

Generally, terminals can be classified into mobile/portable terminals and stationary terminals. The mobile terminals can be classified into handheld terminals and vehicle mount terminals.

As functions of the terminal are diversified, the terminal is implemented as a multimedia player provided with composite functions such as photographing of photos or moving pictures, playback of music or moving picture files, game play, broadcast reception and the like for example.

Recently, many ongoing efforts are made to research and develop a flexible display applicable to an image display device. However, a variable range of the flexible display is normally limited to a predetermined value. If the variable range exceeds the predetermined value, the flexible display may be damaged. However, it is difficult for a general user to recognize the limited range of the variation of the flexible display.

SUMMARY OF THE INVENTION

Accordingly, the present invention is directed to a mobile terminal and controlling method thereof that substantially obviate one or more problems due to limitations and disadvantages of the related art.

An object of the present invention is to provide a method of detecting whether a flexible display is bent in a mobile terminal having the flexible display and informing a user of a bent extent in various ways.

Another object of the present invention is to provide a mobile terminal and controlling method thereof, by which a display configuration can be modified to cope with a flexed shape of a flexible display included in the mobile terminal.

Technical tasks obtainable from the present invention are non-limited the above-mentioned technical task. And, other unmentioned technical tasks can be clearly understood from the following description by those having ordinary skill in the technical field to which the present invention pertains.

To achieve these objects and other advantages and in accordance with the purpose of the invention, as embodied and broadly described herein, a mobile terminal according to the present invention includes a flexible display, at least one sensor arranged in a prescribed form on the flexible display to convert a flex state of the flexible display to an electric signal, and a controller determining the flex state of the flexible display using the electric signal inputted from the at least one sensor, the controller controlling a visual effect corresponding to the determined flex state to be outputted via the flexible display.

In another aspect of the present invention, a method of controlling a mobile terminal includes the steps of detecting a flex state of a flexible display in at least one sensor arranged in a prescribed form on the flexible display, receiving an electric signal corresponding to the detected flex state from the at least one sensor, determining the flex state of the flexible display using the received electric signal, and outputting a visual effect corresponding to the determined flex state via the flexible display.

Accordingly, the present invention provides the following effects and/or advantages.

First of all, a mobile terminal having a flexible display according to at least one embodiment of the present invention detects whether a flexible display is bent and is then able to inform a user of a bent extent using various kinds of audiovisual informations.

Secondly, the present invention is able to modify and display a display configuration to cope with a flexed shape of a flexible display.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating one example of a flex sensor arrangement structure applicable to embodiments of the present invention;

FIG. 6 is a diagram illustrating a display status indicating one example of a method of informing a user of a flex state of a flexible display of a mobile terminal using the flexible display according to one embodiment of the present invention;

FIG. 9 is a diagram illustrating one example of displaying a recommended application to correspond to an available region in a mobile terminal according to another embodiment of the present invention; and FIG. 10 is a diagram illustrating one example of a method of checking a status of a flexible display in a mobile terminal according to a further embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like. The present invention is also applicable to such a stationary terminal as a digital TV, a desktop computer and the like.

Figure 1:
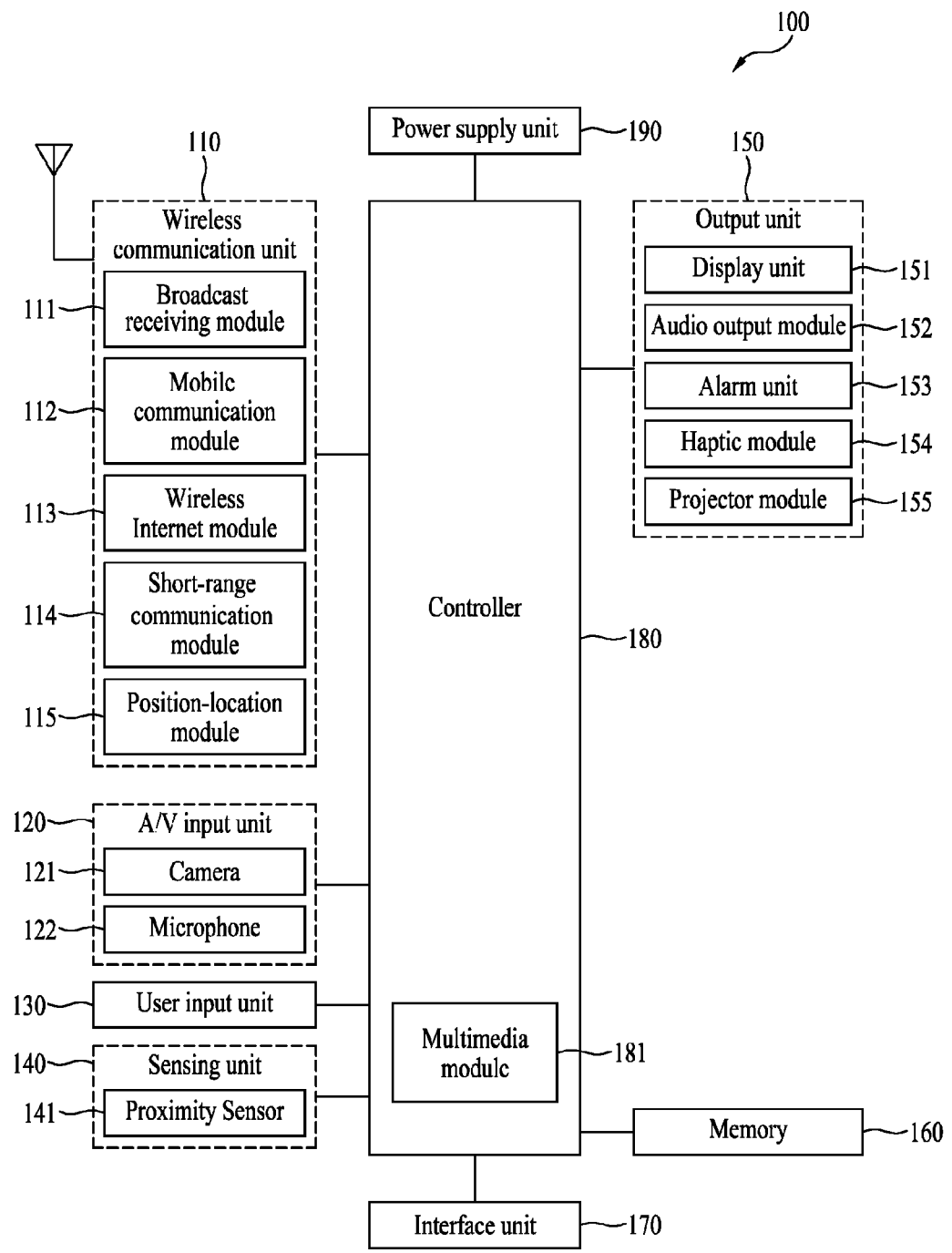
FIG. 1 is a block diagram of a mobile terminal according to one embodiment of the present invention.

FIG. 1 is a block diagram of a mobile terminal according to one embodiment of the present invention. Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access) LTE (Long Term Evolution), etc.

The short-range communication module 114 facilitates relatively short-range communications. Suitable technologies for implementing this module include radio frequency identification (RFID), infrared data association (IrDA), ultrawideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. Further, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-minor device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

For clarity and convenience of the following description, assume that a mobile terminal mentioned in the following description includes at least one of the components shown in FIG. 1. In particular, a mobile terminal, to which the present invention is applicable, may include at least one or more display units. In more particular, the mobile terminal may include at least one flexible display.

In the following description, a flexible display applicable to a display unit of a mobile terminal according to at least one embodiment of the present invention is explained.

First of all, a flexible display means a display device that can be bent or folded owing to its flexible material. In other words, the flexible display means a display device that is light-weight and unbreakable in a manner of being fabricated on a thin and flexible substrate, which can be curved, bent or rolled like a paper, by maintaining display properties of a conventional flat panel display. And, the flexible display may be called a bendable display or the like. Moreover, the flexible display may be implemented using TFTLCD (thin film transistor liquid crystal display) technology, organic EL (OLED) technology, electrophoretic technology, LITI (laser induced thermal image) technology and the like.

Meanwhile, an e-paper (electronic-paper) may be used as a flexible display. The electronic paper is a display device having general features of ink and paper applied thereto and is abbreviated an e-paper. Unlike the traditional flat panel display having a backlight illumination applied to a pixel, an e-paper uses a reflective light like a normal paper. Once an image and/or a text is formed, the e-paper may be able to maintain a shape of the formed image and/or a shape of the formed text without additional power supply.

As the above-described flexible display has the light-weight property and the unbreakable property, if the flexible display is applied to a mobile terminal, various configurations and corresponding functions can be provided to the mobile terminal owing to the free style and arrangement of the flexible display.

In the following description, a flexible display configured in a mobile terminal is explained with reference to FIGS. 2, 3A and 3B.

Figure 2:
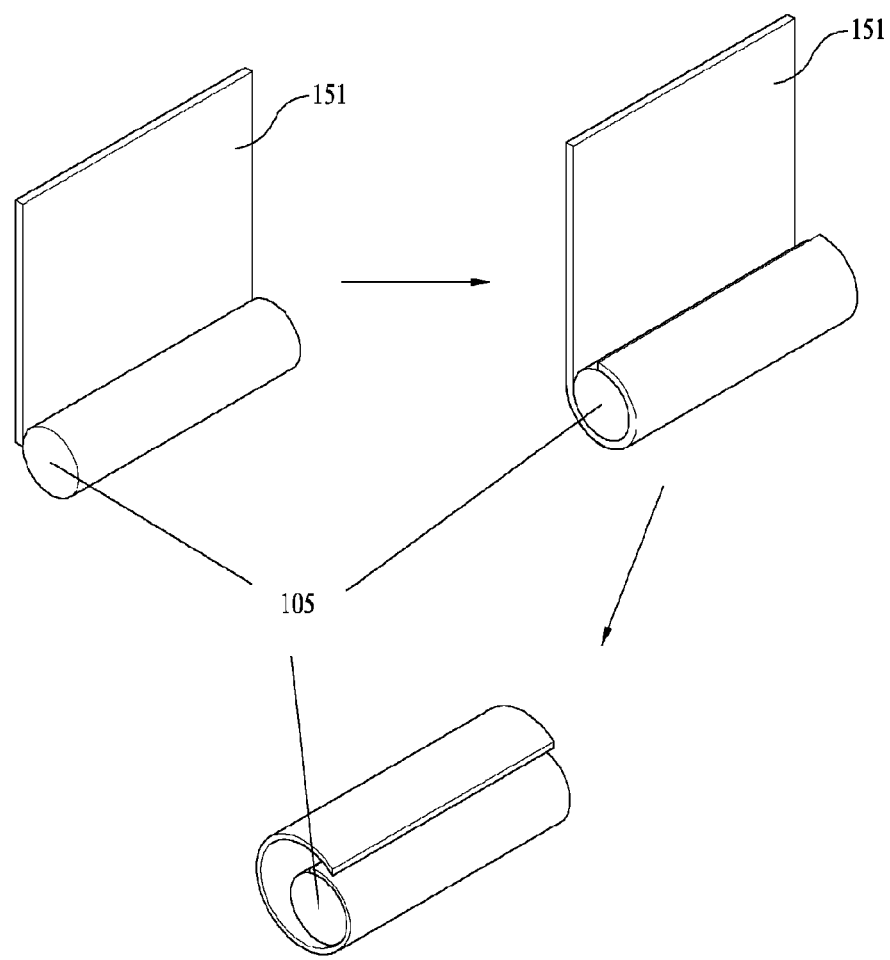
FIG. 2 is a perspective diagram illustrating one example of a cylindrical mobile terminal having a flexible display according to one embodiment of the present invention.

FIG. 2 is a perspective diagram illustrating one example of a cylindrical mobile terminal having a flexible display according to one embodiment of the present invention. FIG. 2 schematically illustrates a flexible display configured in a mobile terminal. For the intuitive understanding of configuring a flexible display in a mobile terminal, other components additionally provided to the mobile terminal are omitted from the drawing.

Referring to FIG. 2, when a flexible display is applied as the display unit 151 of the mobile terminal 100, it may be assembled to the mobile terminal 100 in a lateral length direction of a cylindrical mobile terminal body 105. Hence, when the display unit 151 is not used, a user can keep the display unit 151 by rolling up the display unit 151 on a cylinder. When the display unit 151 is used, the user can use the display unit 151 by freely adjusting a size of the flexible display by unrolling the flexible display as long as necessary.

Figure 3A:
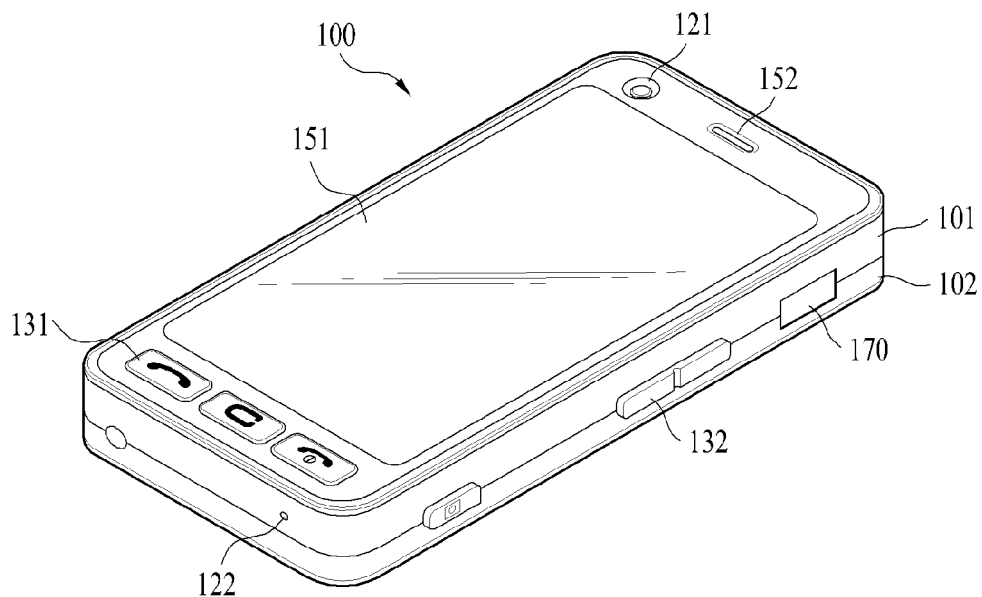
FIG. 3A is a front perspective diagram illustrating one example of a mobile terminal according to the present invention.
Figure 3B:
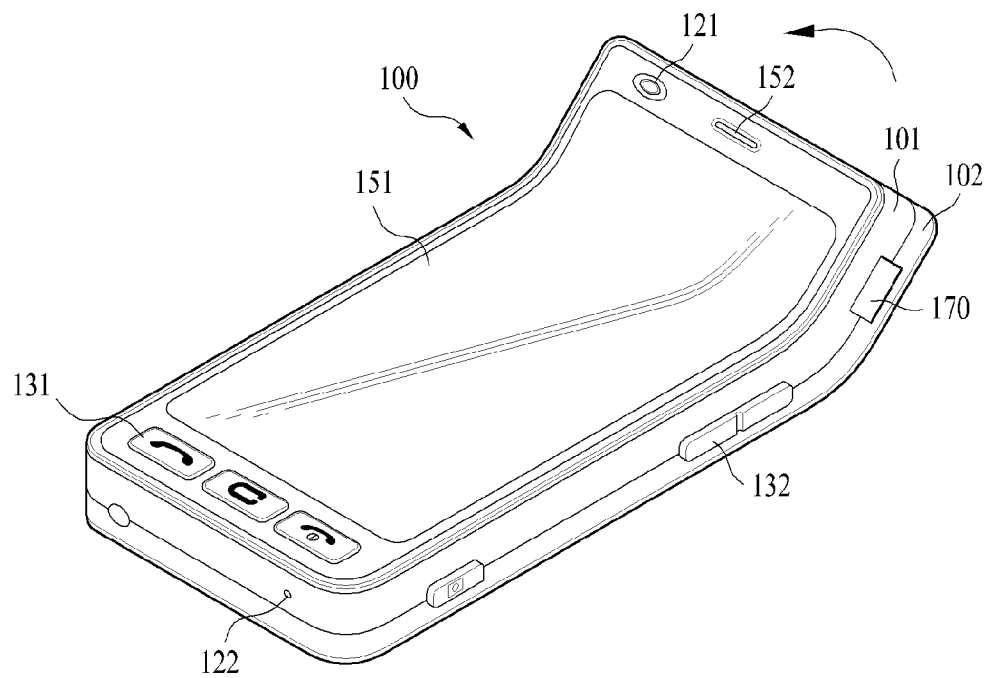
FIG. 3B is a perspective diagram illustrating one example of a mobile terminal according to the present invention to illustrate that a body of the mobile terminal is varied.

In FIGS. 3A and 3B, a flexible display is used as a display unit 151 of a bar type mobile terminal. FIG. 3A shows a normal shape of the mobile terminal 100 and a normal shape of the flexible display. FIG. 3B shows a changed shape of the mobile terminal 100, in which a shape of a body of the mobile terminal 100 and a shape of the flexible display are changed together.

In particular, FIG. 3A is a front perspective diagram illustrating one example of a mobile or portable terminal according to an embodiment of the present invention. The mobile terminal 100 shown in the drawing has a bar type terminal body, which may non-limit the present invention. Moreover, the mobile terminal 100 may be implemented in a variety of different configurations. Examples of such configurations include a slide type, a folder type, a swing type, a swivel type and the like, in which at least two bodies are assembled to enable relative motion.

Referring to FIG. 3A, a body of the mobile terminal 100 includes a case (e.g., a casing, a housing, a cover, etc.) configuring an exterior thereof. According to the present embodiment, the case is divided into a front case 101 and a rear case 102. Various electric/electronic parts may be loaded in a space provided between the front and rear cases 101 and 102. Optionally, at least one middle case may be further provided between the front and rear cases 101 and 102. The cases may be formed by injection molding of synthetic resin or metal substance such as stainless steel (STS), titanium (Ti) and the like for example.

The display unit 151, audio output unit 152, camera 121, user input unit 130 (131/132), microphone 122, interface 170 and the like may be provided to the terminal body, and mainly, to the front case 101.

The display 151 may occupy most of a main face of the front case 101. The audio output unit 151 and the camera 121 may be provided to an area adjacent to one of both end portions of the display 151, while the user input unit 131 and the microphone 122 may be provided to another area adjacent to the other end portion of the display 151. The user input unit 132, the interface 170 and the like may be provided to lateral sides of the front and rear cases 101 and 102.

The user input unit 130 may be manipulated to receive an input of a command for controlling an operation of the terminal 100. In addition, the input unit 130 can include a plurality of manipulating units 131 and 132. The manipulating units 131 and 132 may be generally named a manipulating portion and adopt any mechanism of a tactile manner that enables a user to perform a manipulating action by experiencing a tactile feeling.

Contents input by the manipulating units 131 and 132 may be set in various ways. For instance, such a command as start, end, scroll and the like may be input to the first manipulating unit 131. Also, a command for a volume adjustment of sound output from the audio output unit 152, a command for a switching to a touch recognizing mode of the display 151 or the like may be input to the second manipulating unit 132.

A mobile terminal body shape changed by an external force applied to the above-configured bar type mobile terminal or a driving device inside the mobile terminal is described with reference to FIG. 3B as follows. In particular, FIG. 3B is a perspective diagram illustrating one example of a mobile terminal according to an embodiment of the present invention to illustrate that a body shape of the mobile terminal is changed.

Referring to FIG. 3B, the frame and outward shape of the terminal 100 are changeable. Hence, the outward shape of the mobile terminal 100 can be physically changed in accordance with an output signal of the controller 180 or an external force.

The above-described flexible display configured in the mobile terminal 100 is just exemplary, by which mobile terminals according to various embodiments of the present invention are non-limited. In addition, the mobile terminals according to various embodiments of the present invention may have various configurations and shapes.

Meanwhile, because the aforementioned flexible display can normally maintain the restoring force and functions within a predetermined flex range only, if the shape change of the flexible display exceeds the corresponding flex range, the flexible display may be damaged or broken. Unfortunately, it is difficult for a user to instantaneously recognize the flex range.

Indication of Flexed Extent of Flexible Display

In the following description, a method of informing a user of a flex state of a flexible display using various outputs according to one embodiment of the present invention is proposed. To this end, the controller 180 can determine a bent extent of the flexible display. According to the present embodiment, a sensor determines whether the flexible display is bent and how much the flexible display is bent. One example of the sensor for determining a flex state of the flexible display is a flex sensor. The flex sensor is attached in a prescribed form to a flexible display. When the flexible display is flexed, the flex sensor is flexed together with the flexible display, converts the flexed extent to an electric signal, and then delivers the electric signal to the controller 180.

When a shape of a flexible display is changed, a flexible display structure for a mobile terminal to detect the shape change is described with reference to FIG. 4 as follows. In particular, FIG. 4 is a diagram illustrating one example of a flex sensor arrangement structure applicable to embodiments of the present invention.

Referring to FIG. 4(a), a flex sensor 400 generally has a line or stripe pattern and can measure a flexed extent using a principle that a resistance varies in accordance with a bent extent of a sensor. The greater the flexed extent gets, the smaller the resistance becomes. Within an operating range of the sensor, a resistance varies in proportion to a relatively flexed extent. The controller 180 can thus determine a flexed extent of the flexible display attached to the sensor using a variation of an electric signal in accordance with a resistance change.

A pair of the flex sensors 400 may also be arranged at both end portions of the flexible display 151, respectively (FIG. 4(b)). Further, a plurality of the flex sensors 400 may be arranged in vertical direction and being spaced apart from each other by leaving a predetermined gap in-between (FIG. 4(c)). Also, a plurality of the flex sensors 400 may be arranged in diagonal direction and being spaced apart from each other by leaving a predetermined gap in-between (FIG. 4(d)). In this instance, the sensor can be attached to a flexible display directly or a guide or frame for fixing the flexible display thereto.

In this specification, a method of detecting a flex state of a flexible display is described with reference to a flex sensor, for example, by which the present invention is not limited. For example, the method is applicable to every sensor capable of generating an electric signal differing in accordance with an extent of flex.

When a plurality of sensors are arranged at different positions, respectively, the controller 180 can determine how much a prescribed portion of a flexible display is flexed by analyzing a signal indicating a flexed extent delivered from each of the sensors together with the positions of a plurality of the sensors.

The arrangements shown in FIG. 4 are exemplary, and the arrangements may be variously modified in accordance with such a condition as a preferred accuracy, a limitation of an outward shape and the like.

In the following description, methods for informing a user of a flex state of a flexible display based on a determination made via a sensor are explained with reference to FIGS. 5 and 6. For clarity of the following drawings including FIGS. 5 and 6, a flexible display is only illustrated by omitting other components including a body of the mobile terminal 100 and the like.

Figure 5:
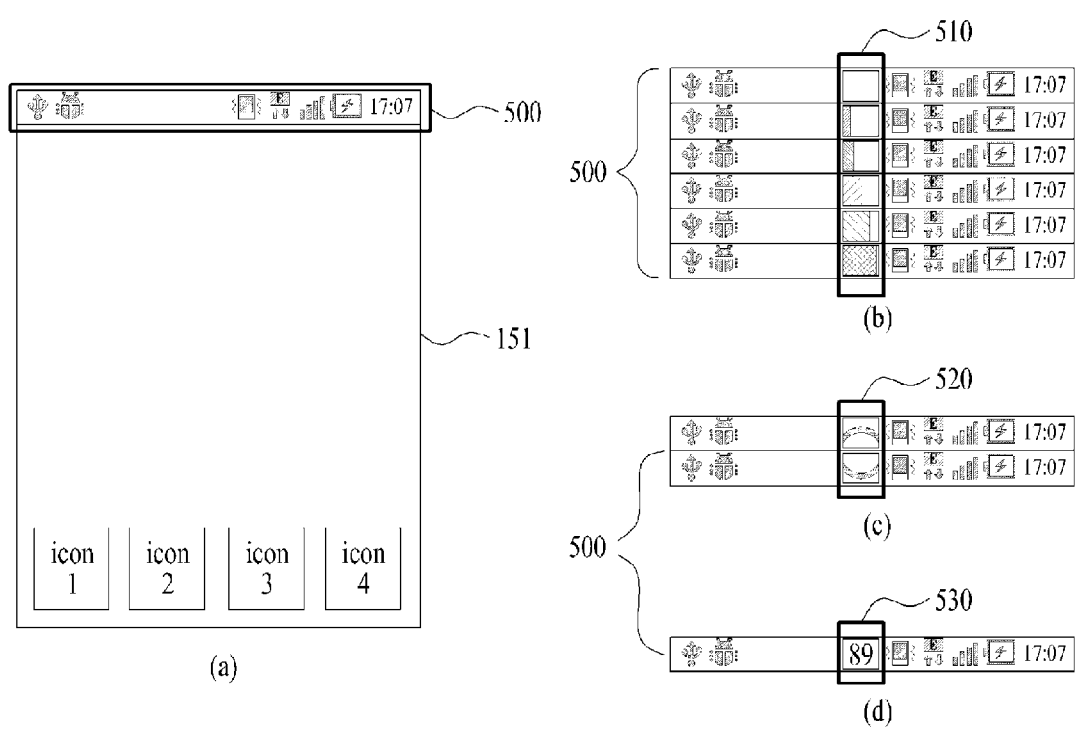
FIG. 5 is a diagram illustrating a display status indicating one example of a method of informing a user of a flex state of a flexible display of a mobile terminal via an indicator region according to one embodiment of the present invention.

FIG. 5 is a diagram illustrating a display status indicating one example of a method for informing a user of a flex state of a flexible display of the mobile terminal 100 via an indicator region according to one embodiment of the present invention.

Referring to FIG. 5(a), an indicator region corresponds to a region always displayed on a predetermined region 500 of the display unit 151 to perform a function of representing various operating statuses (e.g., a current hour, a battery state, a radio signal reception strength, etc.) of the mobile terminal 100. In some instances, the region 500 is covered or not displayed when an application using the entire screen is displayed.

Referring to FIG. 5(b), a gauge bar 510 is displayed within the indicator region. If a flexed extent increasingly rises, the gauge is set to be raised in proportion to the flexed extent. A different color can also be set in accordance with a level of the gauge. For instance, when a flexed extent is low, the gauge can be displayed in blue. If the flexed extent gets closer to a flex limit, the gauge color may be changed to red.

Referring to FIG. 5(c), a diagram 520, which reflects a current flex state, may be displayed within the indicator region 500 to indicate a direction of the flex. In this case, a different color may be given to the diagram 520 in accordance with a flexed extent. Referring to FIG. 5(d), an extent of a flex may be displayed as a numeral 530 within the indicator region.

Of course, a combination of at least two of the above-mentioned various visual effects may be displayed. For instance, the gauge indicating the flexed extent or the diagram indicating the flexed extent may be displayed together with the numeral in a manner that the numeral is superposed on or adjacent to the gage or diagram. Moreover, the aforementioned visual effect may be displayed via a widget arranged on a background screen or a home screen as well as the indicator region.

Next, FIG. 6 is a diagram illustrating a display status indicating another example of a method of informing a user of a flex state of a flexible display of a mobile terminal using the flexible display according to one embodiment of the present invention.

Referring to FIG. 6(a), a flex state of the flexible display 151 may be displayed via a popup window 610 displayed on the flexible display 151. In particular, the popup window 610 may be displayed each time the flex state varies. Alternatively, the popup window 610 may be displayed by prescribed periods or in accordance with each prescribed variation. Of course, the popup window 610 may be set to be displayed to prevent a displayed information being unseen unnecessarily only if a flexed extent exceeds a preset value.

A flexed extent may also be displayed as a numeral on the popup window 610, as shown in the drawing. Alternatively, various visual effects described with reference to FIG. 5 may be displayed singly or in combination.

The popup window 610 may be set to disappear if a prescribed duration elapses after displaying the popup window 610 or a flexed extent becomes smaller than a preset value. When flexible display 151 includes a touchscreen, if a touch to a partial region of the popup window 610 is detected, the controller 180 can stop displaying the popup window 610.

If a flexed extent reaches a preset limit range, as shown in FIG. 6(b), a popup window 620 containing a warning text may be displayed. If the flexible display is flexed to exceed the limit range again, as shown in FIG. 6(c), the controller 180 may stop operating the flexible display.

Also, when a stationary display unit is provided to a mobile terminal as well as a flexible display, the indicator region shown in FIG. 5 may be displayed on the flexible display or another display unit that is not the flexible display. Moreover, when a flexed extent exceeds a preset value, the controller 180 may output a warning sound using the audio output unit 152 or generate various tactile effects such as a vibration and the like via the haptic module 154 as well as the aforementioned visual effect. This audio output or tactile effect may be output in one of a plurality of different forms in accordance with a flexed extent.

Display Layout Change in Accordance with Flex State

According to another embodiment of the present invention, the controller 180 detects a flex state of the flexible display 151, determines a displayable region in accordance with the detected flex state, and then changes a display layout in accordance with a size and/or shape of the determined region. This is described with reference to FIGS. 7 and 8 as follows.

Figure 7:
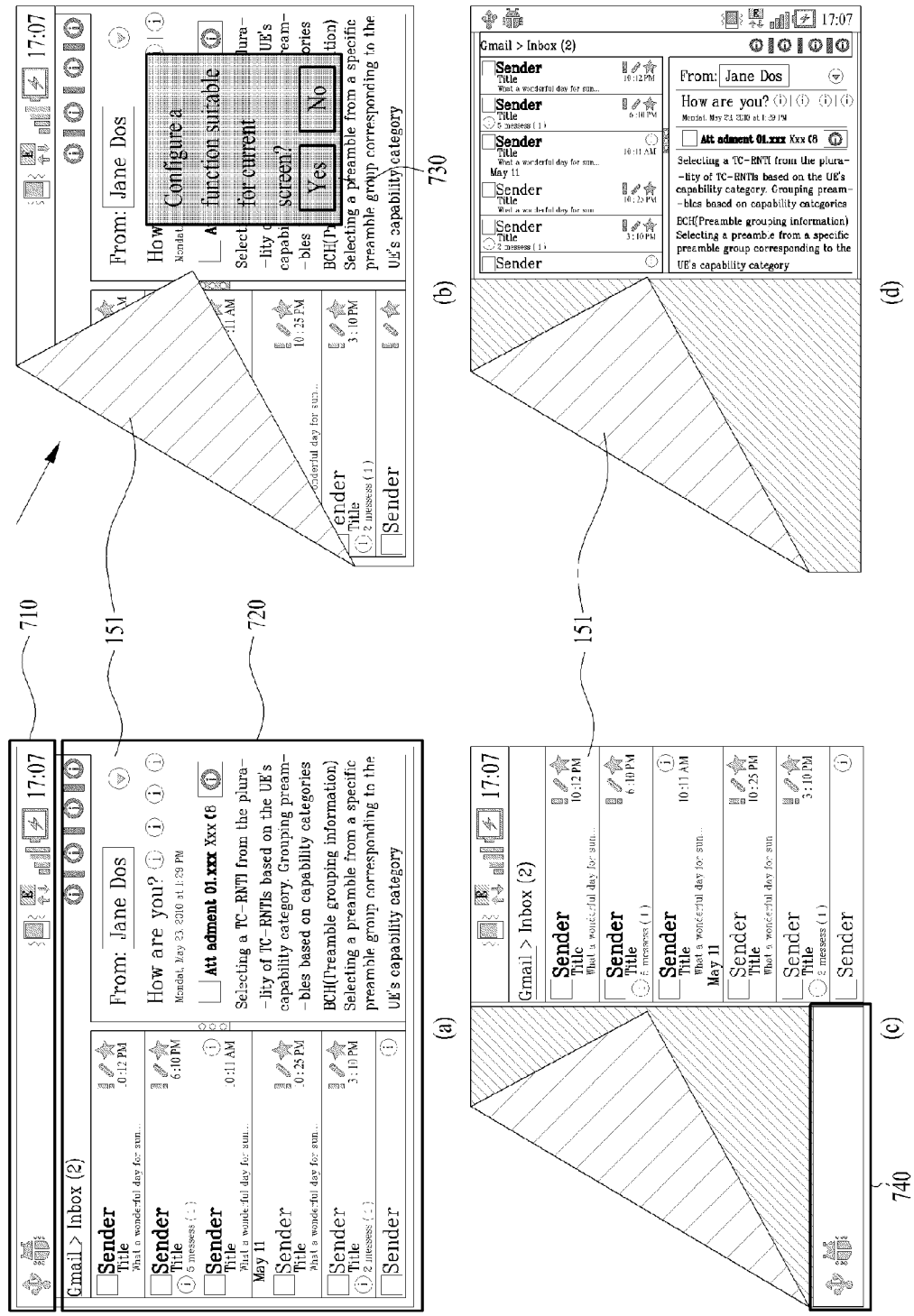
FIG. 7 is a diagram illustrating one example of changing a layout to correspond to a flex of a flexible display of a mobile terminal according to another embodiment of the present invention.

FIG. 7 is a diagram illustrating one example of changing a layout to correspond to a flex of a flexible display of the mobile terminal 100 according to another embodiment of the present invention. Referring to FIG. 7, the controller 180 uses the aforementioned flex sensor to detect a flex state of a flexible display.

Referring to FIG. 7(a), an indicator region 710 is provided to a top end of the flexible display 151 and that an email application 720 is displayed below the indicator region 710. In particular, a list of emails is displayed on a left part of the email application 720 and a content of a specific mail is displayed on a right part of the email application 720.

Referring to FIG. 7(b), as a left top end region of the flexible display 151 is folded (e.g., because the user is unable to check a portion of a left part of the flexible display 151), the controller 180 can calculate a folded position and extent of folding. For clarity and convenience, a portion of the flexible display 151 folded over a predetermined angle and an unfolded portion blocked by the folded portion is called an 'unavailable region'. The rest of the portion of the flexible display 151 except the unavailable region, i.e., a normally displayable portion is called an 'available region'. In determining the unavailable region, the controller 180 partitions a region into at least two regions with reference to a largest folded portion (or a portion within a prescribed range of the largest folded portion) and then determines a relatively small region as a folded portion.

Once the controller 180 determines the unavailable region, the controller 180 can display a popup window 730 on the available region to query whether to change a layout to be suitable for the available region.

If a user inputs a layout change command via the user input unit 130, referring to FIG. 7(c), the controller 180 controls a portion, on which a content of the email list is displayed, to be displayed on a right available region while a portion of the indicator region is displayed on a left available region 740. Of course, when the left available region is determined as sufficient in accordance with the determination made by the controller 180, a layout may be changed to display a portion of the email list as well as the indicator region.

Referring to FIG. 7(d), the controller 180 can control both of the indicator region and the email application to be displayed on the right available region by reducing and rotating the layout. Further, a flexed extent of the flexible display 151, which is described with reference to FIG. 5, may be visually displayed on the aforementioned indicator region as well.

Figure 8:
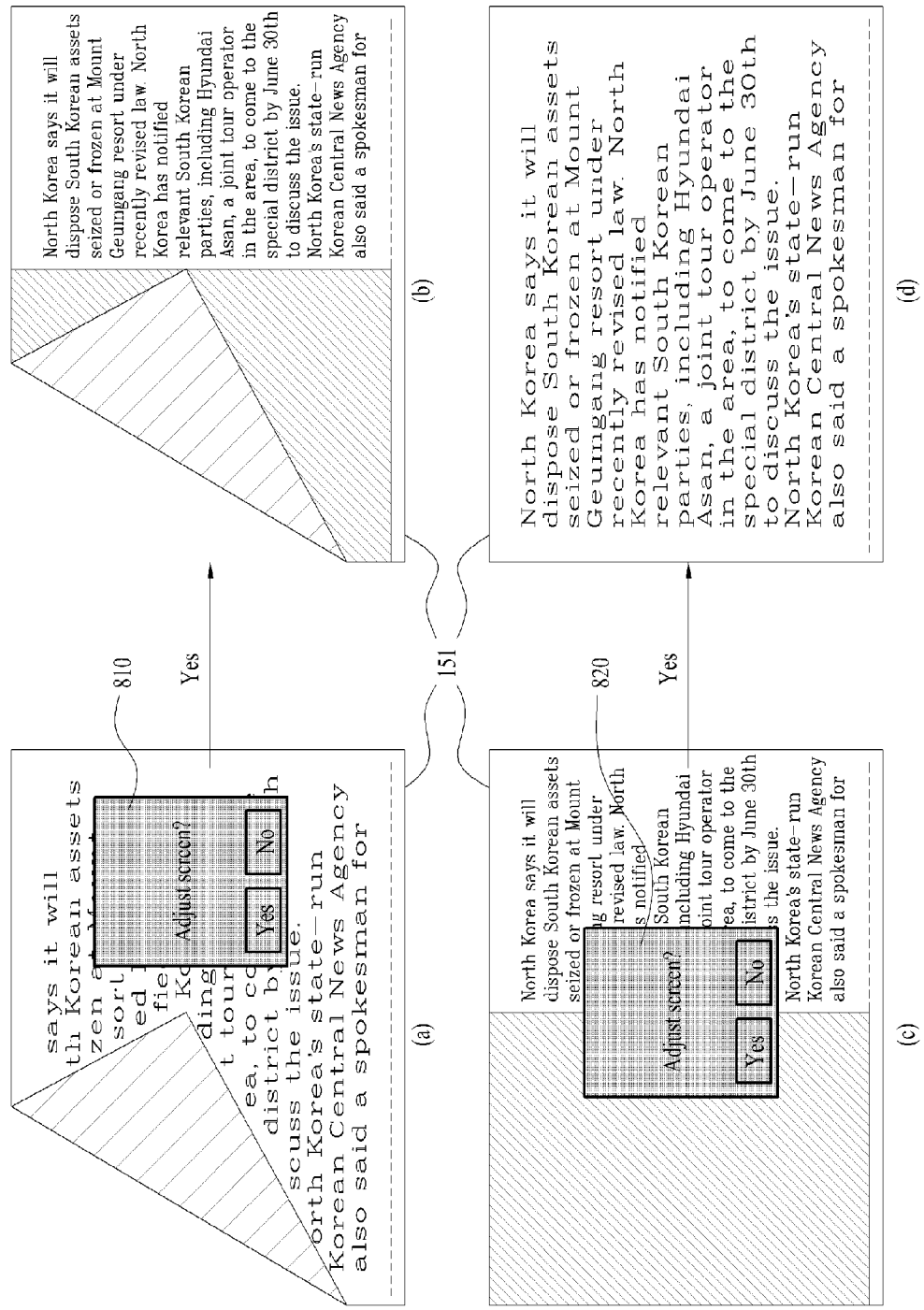
FIG. 8 is a diagram illustrating another example of changing a layout to correspond to a flex of a flexible display of a mobile terminal according to another embodiment of the present invention.

Next, FIG. 8 is a diagram illustrating another example of changing a layout to correspond to a flex of the flexible display of the mobile terminal 100 according to another embodiment of the present invention. Referring to FIG. 8(a), when text is displayed on the flexible display 151, and a left top end is folded to generate an unavailable region, the controller 180 displays a popup window 810 to query whether to change a layout. If the user selects 'Yes (change layout)', referring to FIG. 8(b), the controller 180 changes the text layout to be suitable for an available region by changing such a form as a word spacing, a line feed, a line spacing, a font size and the like.

On the other hand, referring to FIG. 8(c), as a flex state is cancelled, and the unavailable region disappears, the controller 180 displays a popup window 820 to query whether to change a current layout into an original layout. Thereafter, referring to FIG. 8(d), the controller 180 changes the text layout to use the entire available region in accordance with a selection made by the user.

According to the description with reference to FIGS. 7 and 8, if an unavailable region is generated by a flex, a popup window may be displayed. Optionally, a layout may be automatically changed in accordance with a setting without displaying a popup window.

Meanwhile, according to another example of the present embodiment, the controller 180 detects a flex state of the flexible display 151, determines a displayable region corresponding to the detected flex state, and then recommends an application suitable for a size and/or shape of the determined region. This is described with reference to FIG. 9 as follows.

In particular, FIG. 9 is a diagram for one example of displaying a recommended application to correspond to an available region in a mobile terminal according to another embodiment of the present invention.

Referring to FIG. 9, the controller 180 may recommend an application to correspond to a size and/or shape of an available region. One example of a recommendation reference, if an available region 910 is configured in the landscape direction, referring to FIG. 9(a), the controller 180 can display a popup window 920 containing such an application providing an optimal layout for a landscape display as a web browser application, a photo view application, a movie play application and the like. On the contrary, if an available region 930 is configured in the portrait direction, referring to FIG. 9(b), the controller 180 can display a popup window 940 containing such an application providing an optimal layout for a landscape display as a message write function application, an email application, a music play application and the like.

The classification examples of the applications are just exemplary and may be changeable to correspond to a layout configuration. For instance, a user-preferred application can be set per direction in advance and then saved in the memory 160. In another instance, a user's preference is determined cumulatively by learning of the controller 180. The reference for the controller 180 to select a recommended application may also include a flexed extent, a flexed position and the like as well as an orientation (or direction).

Calibration of Flexible Display

Meanwhile, a flexible display or a sensor may be minutely deformed by a long-term use of the flexible display, an incorrect storing of the flexible display, an external shock and the like. Such deformation may cause a problem that a flex state of the flexible display determined by the controller 180 is different from a real state.

To solve this problem, according to a further embodiment of the present invention, a calibration function of a flexible display is proposed as follows. In particular, FIG. 10 is a diagram illustrating one example of a method of checking a status of the flexible display in the mobile terminal 100 according to a further embodiment of the present invention.

Referring to FIG. 10(a), if a user performs a prescribed menu manipulation, a calibration menu may be entered. In the entered calibration menu, a popup window 1010 may be displayed to request a user to place a flexible display at a flat level to perform calibration and to receive a confirmation (Yes) to proceed.

If a user inputs the confirmation to proceed, referring to FIG. 10(b), the controller 180 analyzes signals input from a flex sensor and the like and then gives a prescribed visual effect to a flex existing region. Hence, the user may be able to check whether a portion determined as the flex existing region is actually flexed with reference to the visual effect. Thereafter, if the time displayed on a popup window 1020 expires, the controller 180 can set a current state value indicated by the flex sensor to an initial value.

Accordingly, the present invention provides the following advantages. First of all, a mobile terminal having a flexible display according to at least one embodiment of the present invention detects whether a flexible display is bent and can then inform a user of a bent extent using various kinds of audiovisual informations.

Secondly, the present invention can modify and display a display configuration to cope with a flexed shape of a flexible display.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet).

The aforementioned embodiments of the mobile terminal having the flexible display may be achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to wirelessly communicate with at least one other terminal;
   a flexible display;
   at least one sensor arranged in a prescribed form on the flexible display and configured to convert a flex state of the flexible display into an electric signal; and
   a controller configured to:
   determine the flex state of the flexible display using the electric signal input from the at least one sensor, the flex state of the flexible display including a flex extent of the flexible display,
   control a visual effect corresponding to the determined flex state and output the visual effect on the flexible display, and
   display popup window as the visual effect on the flexible display when the flexed extent reaches a preset limit range,
   wherein after the popup window has been displayed, and when a determined duration expires or the flexed extent goes below the preset limit range, the controller is further configured to stop displaying the popup window.

2. The mobile terminal of claim 1, wherein the flex state further comprises a flexed position of the flexible display.

3. The mobile terminal of claim 1, wherein the visual effect includes one or more of a graph, a diagram, a numeral and a color that changes in accordance with the determined flex state.

4. The mobile terminal of claim 1, wherein the controller is further configured to display another visual effect different from the popup window on an indicator region of the flexible display.

5. The mobile terminal of claim 1, wherein the controller is further configured to display the popup window on a prescribed region of the flexible display.

6. The mobile terminal of claim 1, wherein the controller is further configured to stop operating the flexible display when the flexed extent exceeds the preset limit range.

7. The mobile terminal of claim 1, wherein the controller is further configured to display the popup window each time the flexed extent reaches the preset limit range.

8. The mobile terminal of claim 1, further comprising:
   an audio output unit configured to output a sound effect,
   wherein the controller is further configured to vary the sound effect in accordance with the determined flex state and to output the varied sound effect using the audio output unit.

9. The mobile terminal of claim 1, further comprising:
   a haptic module configured to generate vibration,
   wherein the controller is further configured to vary the vibration in accordance with the determined flex state and to output the varied vibration using the haptic module.

10. A mobile terminal comprising:
    a wireless communication unit configured to wirelessly communicate with at least one other terminal;
    a flexible display;
    at least one sensor arranged in a prescribed form on the flexible display and configured to convert a flex state of the flexible display into an electric signal; and
    a controller configured to:
    determine the flex state of the flexible display using the electric signal input from the at least one sensor, and display a function list including at least one different function in accordance with the flex state on the flexible display,
wherein the controller is further configured to display no user graphic on a first region in the flexible display flexed to exceed a preset reference, and display no user graphic on a second region blocked by the flexed first region in the flexible display.

11. The mobile terminal of claim 10, wherein the controller is further configured to:
determine an available region in the flexible display using the determined flex state and then determine an optimal display layout in accordance with a size and shape of the available region, and
wherein the at least one different function is suitable for the determined optimal display layout on the flexible display.

12. The mobile terminal of claim 11, wherein the controller is further configured to apply the determined optimal display layout to a currently active function.

13. A method of controlling mobile terminal, the method comprising:
allowing, via a wireless communication unit of the mobile terminal, wireless communication with at least one other terminal;
determining, via at least one sensor arranged in a prescribed form on a flexible display, a flex state of the flexible display using an electric signal input from the at least one sensor, the flex state of the flexible display including a flexed extent of the flexible display, and
controlling, via a controller of the mobile terminal, a visual effect corresponding to the determined flex state;
outputting, via the controller, the visual effect on the flexible display; and
displaying a popup window as the visual effect on the flexible display when the flexed extent reaches a preset limit range,
wherein after the popup window has been displayed, and when a determined duration expires or the flexed extent goes below the preset limit range, the method further comprises stop displaying the popup window.

14. The method of claim 13, wherein the visual effect includes one or more of a graph, a diagram, a numeral and a color that changes in accordance with the determined flex state.

15. The method of claim 13, further comprising:
stop operating the flexible display when the flexed extent exceeds the preset limit range.

16. The method of claim 13, further comprising:
outputting, via an audio output unit of the mobile terminal, a sound effect that is varied in accordance with the determined flex state and/or outputting, via a haptic module of the mobile terminal, a vibration in accordance with the determined flex state.

17. A method of controlling a mobile terminal, the method comprising:
allowing, via a wireless communication unit of the mobile terminal, wireless communication with at least one other terminal;
determining, via at least one sensor arranged in a prescribed form on a flexible display, a flex state of the flexible display using an electric signal input from the at least one sensor;
controlling, via a controller of the mobile terminal, the flexible display to display a function list including at least one different function in accordance with the flex state; and
displaying no user graphic on a first region in the flexible display flexed to exceed a preset reference, and displaying no user graphic on a second region blocked by the flexed first region in the flexible display.

* * * * *